United States Patent
Utsuno et al.

(10) Patent No.: US 11,387,486 B2
(45) Date of Patent: Jul. 12, 2022

(54) SULFIDE SOLID ELECTROLYTE

(71) Applicant: IDEMITSU KOSAN CO., LTD., Tokyo (JP)

(72) Inventors: Futoshi Utsuno, Chiba (JP); Toshiaki Tsuno, Chiba (JP); Kota Terai, Chiba (JP); Atsushi Sato, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 280 days.

(21) Appl. No.: 16/637,513

(22) PCT Filed: Aug. 6, 2018

(86) PCT No.: PCT/JP2018/029369
§ 371 (c)(1),
(2) Date: Feb. 7, 2020

(87) PCT Pub. No.: WO2019/031436
PCT Pub. Date: Feb. 14, 2019

(65) Prior Publication Data
US 2020/0220208 A1 Jul. 9, 2020

(30) Foreign Application Priority Data
Aug. 10, 2017 (JP) .............................. JP2017-154965

(51) Int. Cl.
*H01M 4/02* (2006.01)
*H01M 10/0562* (2010.01)
(Continued)

(52) U.S. Cl.
CPC ......... *H01M 10/0562* (2013.01); *C01B 25/14* (2013.01); *H01M 4/1315* (2013.01);
(Continued)

(58) Field of Classification Search
CPC ...................................................... H01M 4/02
See application file for complete search history.

(56) References Cited

U.S. PATENT DOCUMENTS

| 8,697,292 B2 | 4/2014 | Kanno et al. |
| 2011/0081580 A1 | 4/2011 | Stadler et al. |
(Continued)

FOREIGN PATENT DOCUMENTS

| JP | 2008004459 A | 1/2008 |
| JP | 2016081617 A | 5/2016 |
(Continued)

OTHER PUBLICATIONS

Notice of Reasons for Refusal in corresponding JP2019-535640 dated Aug. 24, 2021 (pp. 1-3) and english translation thereof (pp. 1-3).

(Continued)

*Primary Examiner* — Jacob B Marks
(74) *Attorney, Agent, or Firm* — Millen, White, Zelano & Branigan, PC; Ryan Pool (57) ABSTRACT

A sulfide solid electrolyte comprising lithium, phosphorus and sulfur, wherein the sulfide solid electrolyte has a diffraction peak A at $2\theta=25.2\pm0.5$ deg and a diffraction peak B at $29.7\pm0.5$ deg in powder X-ray diffraction using CuKα rays, an area ratio of a peak derived from $PS_4^{3-}$ glass to the total area of peaks derived from glass observed in solid $^{31}$P-NMR measurement is 90% or more and 100% or less, and an area ratio of peaks derived from glass to the total area of all peaks at 60 to 120 ppm observed in solid $^{31}$P-NMR measurement is 1% or more and 45% or less.

21 Claims, 3 Drawing Sheets

(51) Int. Cl.
*H01M 10/653* (2014.01)
*C01B 25/14* (2006.01)
*H01M 4/1315* (2010.01)
*H01M 10/0525* (2010.01)
*H01M 10/48* (2006.01)

(52) U.S. Cl.
CPC ..... *H01M 10/0525* (2013.01); *H01M 10/484* (2013.01); *H01M 10/653* (2015.04); *C01P 2002/74* (2013.01)

(56) References Cited

U.S. PATENT DOCUMENTS

| 2013/0040208 | A1 | 2/2013 | Kanno et al. | |
|---|---|---|---|---|
| 2015/0340734 | A1* | 11/2015 | Homma ................... | H01B 1/10 429/322 |
| 2016/0156064 | A1 | 6/2016 | Miyashita et al. | |
| 2020/0006808 | A1 | 1/2020 | Utsuno et al. | |

FOREIGN PATENT DOCUMENTS

| JP | 2017010936 A | 1/2017 |
|---|---|---|
| JP | 2017120728 A | 7/2017 |
| WO | 11118801 A1 | 9/2011 |
| WO | 2011118801 A1 | 9/2011 |
| WO | 18164224 A1 | 9/2018 |
| WO | 2018164224 A1 | 9/2018 |

OTHER PUBLICATIONS

Extended European Search Report dated Apr. 13, 2021 issued against corresponding European Patent Appln. No 18843908.7 (pp. 1-8).
International Search Report for PCT/JP2018/029369 dated Oct. 30, 2018.
English Abstract of JP2017010936, Publication Date: Jan. 12, 2017.
English Abstract of JP2008004459, Publication Date: Jan. 10, 2008.
English Abstract of JP2017120728, Publication Date: Jul. 6, 2017.
International Search report (pp. 1-3) for PCT/JP2018/029369 dated Oct. 30, 2018.
Written Opinion dated Feb. 11, 2020 for PCT/JP2018/029369 (pp. 1-12).

* cited by examiner

SULFIDE SOLID ELECTROLYTE

TECHNICAL FIELD

The invention relates to a sulfide solid electrolyte.

BACKGROUND ART

With rapid spread of information-related equipment or communications equipment such as personal computers, video cameras, and mobile phones in recent years, development of batteries used as a power source thereof has been considered to be important. Among these batteries, a lithium ion battery has attracted attention from a viewpoint of high energy density.

In the lithium ion battery that is currently commercially available, a liquid electrolyte containing a flammable organic solvent is used, and therefore, attachment of a safety device that suppresses an increase in temperature at the time of short circuit, or improvement in structural and material aspects for preventing short circuit is required. On the other hand, in the lithium ion battery formed into all-solid-state battery by using a solid electrolyte in place of the liquid electrolyte, it is considered that the flammable organic solvent is not used in the battery, and therefore, the safety device can be simplified, and the lithium ion battery is excellent in a production cost or productivity.

A sulfide solid electrolyte is known as a solid electrolyte used for a lithium ion battery. Various crystal structures of sulfide solid electrolyte are known, but a stable crystal structure whose structure is hardly changed over a wide temperature range is suitable from the viewpoint of expanding the operating temperature range of the battery. As such a sulfide solid electrolyte, for example, a sulfide solid electrolyte having an argyrodite-type crystal structure has been developed, for example, see Patent Documents 1 to 5.

A sulfide solid electrolyte having a crystalline structure of a stable phase such as an argyrodite-type crystal structure requires heat treatment at a high temperature (e.g., 550° C.) in manufacturing. Generally, heat treatment at high temperature promotes crystallization and increases crystallinity. As a result, the sulfide solid electrolyte may become hard. Hardness of the sulfide solid electrolyte causes various problems in manufacturing a battery. For example, when the solid electrolyte layer is formed by pressurizing and adhering the sulfide solid electrolyte particles (compaction molding), since the particles are hardly deformed, the contact area between the particles becomes small, and ion paths may not be sufficiently formed. When the electrode layer is formed, the active material particles used may be broken when the electrode layer is mixed with sulfide solid electrolyte particles.

In order to solve the above-mentioned problems, for example, as described in Patent Document 6, it is conceivable to include a large amount of glass in the sulfide solid electrolyte.

RELATED ART DOCUMENTS

Patent Documents

[Patent Document 1] JP 2010-540396 A
[Patent Document 2] WO 2015/011937
[Patent Document 3] WO 2015/012042
[Patent Document 4] JP 2016-24874 A
[Patent Document 5] WO 2016/104702
[Patent Document 6] JP 2008-103203 A

SUMMARY OF THE INVENTION

Since glass is softer than crystal, the compaction property of the sulfide solid electrolyte is improved by including a large amount of glass, but there is a tendency that the ionic conductivity is lowered. Therefore, even if the compaction property is improved, it may not contribute to the improvement of the performance of the lithium ion battery.

It is an object of the present invention to provide a sulfide solid electrolyte for obtaining a lithium ion battery having a high capacity retention ratio.

According to an embodiment of the present invention, a sulfide solid electrolyte comprising lithium, phosphorus and sulfur, wherein the sulfide solid electrolyte has a diffraction peak A at $2\theta=25.2\pm0.5$ deg and a diffraction peak B at $29.7\pm0.5$ deg in powder X-ray diffraction using CuK$\alpha$ rays, an area ratio of a peak derived from $PS_4^{3-}$ glass to the total area of peaks derived from glass observed in solid $^{31}$P-NMR measurement is 90% or more and 100% or less, and an area ratio of peaks derived from glass to the total area of all peaks at 60 to 120 ppm observed in solid $^{31}$P-NMR measurement is 1% or more and 45% or less, is provided.

According to an embodiment of the present invention, a sulfide solid electrolyte for obtaining a lithium ion battery having a high capacity retention ratio can be provided.

MODE FOR CARRYING OUT THE INVENTION

The sulfide solid electrolyte according to one embodiment of the present invention contains lithium, phosphorus and sulfur as constituent elements; and the following requirements 1 and 2 are satisfied.

Requirement 1

Having a diffraction peak A at $2\theta=25.2\pm0.5$ deg and a diffraction peak B at $29.7\pm0.5$ deg in powder X-ray diffraction using CuK$\alpha$ rays.

Requirement 2

An area ratio of a peak derived from $PS_4^{3-}$ glass to the total area of peaks derived from glass observed in solid $^{31}$P-NMR measurement is 90% or more and 100% or less, and an area ratio of peaks derived from glass to the total area of all peaks at 60 to 120 ppm observed in solid $^{31}$P-NMR measurement is 1% or more and 45% or less.

For the Requirement 1, the diffraction peak A and the diffraction peak B are peaks derived from the argyrodite-type crystal structure. In addition to the diffraction peak A and the diffraction peak B, diffraction peaks derived from the argyrodite-type crystal structure may also appear, for example, at 2θ=15.3±0.5 deg, 17.7±0.5 deg, 31.1±0.5 deg, 44.9±0.5 deg or 47.7±0.5 deg. The sulfide solid electrolyte of this embodiment may have these peaks.

In the present application, the position of the diffraction peak is determined by A±0.5 deg when the median value is A, but A±0.3 deg is preferred. For example, in the case of the above-mentioned diffraction peak of 2θ=25.2±0.5 deg, the median value A is 25.2 deg, and it is preferable that the diffraction peak is present in the range of 2θ=25.2±0.3 deg. The same can be applied to determination of all of the other diffraction peak positions in the invention.

For the Requirement 2, this requirement means that the sulfide solid electrolyte contains a predetermined quantity of glass and that the majority of glass is $PS_4^{3-}$ glass.

Since the sulfide solid electrolyte contains a predetermined amount of a relatively-soft glass component as compared with the crystal structure, the adhesion between particles is improved when the glass component is compacted. Among them, $PS_4^{3-}$ glass is considered to have smaller sizes among the glass components, and therefore, plastic deformation becomes easier by containing a large amount of $PS_4^{3-}$ glass. Whereby the contacting area between particles of the electrode material and the like and particles of the sulfide solid electrolyte increase at the time of molding the battery, thereby the battery performance is considered to improve.

In addition, the argyrodite-type crystal structure has a $PS_4^{3-}$ structure as a basic skeleton, and has a structure in which halogens are uniformly dispersed at specified sites. In the present embodiment, for example, after a solid electrolyte containing highly crystalline argyrodite-type crystal structure (precursor) is formed by heat treatment, a portion of the argyrodite-type crystal structure is vitrified by treatment with a media-less pulverizer. Therefore, it can be presumed that glass formed by the above treatment has components and distributions (such as units and halogens) similar to the argyrodite-type crystal structure. Therefore, it is considered that the decrease of the ionic conductivity is suppressed as compared with the case of containing a large amount of other glasses because the glass has a very good interface consistency with the argyrodite-type crystal structure.

In one embodiment, the area ratio of peaks derived from $PS_4^{3-}$ glass is more preferably 95% or more and 100% or less.

The area ratio of the peak derived from glass to the total area of all peaks at 60 to 120 ppm is preferably 2% or more and 40% or less, more preferably 5% or more and 40% or less.

Identification of peaks and area ratio in solid $^{31}$P-NMR measurement are calculated from an area and half-value width of each peak by separating signals observed in 60 to 120 ppm of a solid $^{31}$P-NMR spectrum into each peak by the nonlinear least squares method.

Although the argyrodite-type crystal structure contains a $PS_4^{3-}$ structure in a crystal, the chemical shifting positions of peaks obtained in solid $^{31}$P-NMR measurement in each crystal differ due to the difference in symmetry of the crystal and the difference in coordination states of atoms around the $PS_4^{3-}$ structure. On the other hand, as a glass, a glass composed of a $PS_4^{3-}$ structure, a $P_2S_7^{4-}$ structure and a $P_2S_6^{4-}$ structure has been reported, and chemical shifts of these chemical structures are observed at positions different from the chemical shift positions of the peaks of the above-mentioned crystals, and the half-value widths are greatly different from the peaks derived from the crystals. Generally, the peak derived from the crystal has a relatively narrow half-value width, and the peak derived from glass has a relatively wide half-value width. For example, in the measurement results of the present Examples and Comparative Examples, the half-value width of the peak derived from the crystal is 450 Hz or less, whereas the half-value width of the peak derived from glass is more than 1000 Hz. For the identification of separated peaks, for example, H. Eckert, Z. Zhang, and H. Kennedy, Chem. Mater. See Vol 2, No. 3, 273 (1990) can be referred.

By taking advantage of the above differences, the solid $^{31}$P-NMR spectrum of sulfide solid electrolyte can be separated into crystalline peaks and glass peaks, and the area of each peak can be quantified. Details will be described in the following Examples. Each peak area indicates the amount of phosphorus present in the same surrounding environment.

In one embodiment, it is preferable that an intensity ratio (Ib/Ip) between a peak intensity Ip of the diffraction peak B and a diffraction intensity Ib of a high-angle-side low part of the diffraction peak B is 0.050 or more and 0.200 or less.

The peak intensity Ip is a height of a diffraction peak (diffraction peak B) having a peak top within a range of 2θ=29.7±0.5 deg in powder X-ray diffraction measurement using CuKα rays. When 2 or more diffraction peaks are present in the above range, the strongest diffraction peak is defined as the diffraction peak B.

The diffraction intensity Ib is the diffraction intensity at a high-angle-side low part of the peak having the peak intensity Ip. Specifically, in the differential curve obtained by differentiating the periphery of the region including the diffraction peak B after smoothing the X-ray diffraction pattern obtained by powder X-ray diffraction measurement, the diffraction intensity Ib is a diffraction intensity at the minimum angle larger than the angle of the peak top of the diffraction peak B, and at which the differential value becomes 0.

The present inventors presume that the diffraction intensity Ib is the intensity of broad peaks (halo patterns) derived from glass (amorphous components), and that the strong diffraction intensity Ib indicates that glass is generated in the surface layer of the sulfide solid electrolyte. Since a predetermined quantity of glass is formed on the surface layer of the sulfide solid electrolyte, the compaction property of the sulfide solid electrolyte can be easily improved.

More preferably, the intensity ratio (Ib/Ip) is 0.050 or more and 0.120 or less.

In the present invention, since the diffractive peaks B derived from the crystalline structures contained in the sulfide solid electrolyte and the halo patterns derived from amorphous components overlap with each other, they are separated from each other by using the differential curves described above.

Details of methods for measuring powder X-ray diffraction are given in the Examples.

In one embodiment of the present invention, it is preferable that the Si-relative half-value width of the diffraction peak B is 1.25 or more and 2.50 or less.

This requirement stipulates that the half-value width of the typical diffraction peak (diffraction peak B) of the argyrodite-type crystal structure is narrow. Generally, the diffraction peak of the powder X-ray diffraction measurement has a width, and the width of the peak at a height of half of the peak height obtained by subtracting the background is referred to as the half-value width. It is known that there is a correlation between the half-value width and the crystallite size. When the crystallite size is large, the crystallinity becomes high and the repeating regularity of the crystal structure becomes high, so that the intensity of the diffraction peak of the powder X-ray diffraction measurement becomes strong and the half-value width becomes narrow. However, since the half-value width of the diffraction peak depends on the measurement apparatus and the measurement conditions, it is necessary to compare the half-value width of the diffraction peak with a standard sample.

When the sulfide solid electrolyte is glassy, the half-value width is extremely large and the diffractive peaks are broadened.

The sulfide solid electrolyte of the present embodiment contains glass in a part, but maintains high crystallinity as a whole. This maintains high ionic conductivity.

More preferably, the Si-relative half-value width of the diffraction peak B is 1.25 or more and 2.00 or less.

Note that the Si-relative half-value width of the diffraction peak B is obtained by using Si as a standard sample, and given as a ratio relative to the measured value of the diffraction peak of Si at 2θ=28.6±0.5 deg. In order to correct a variation in the measured value of the diffraction peak B due to a difference in the measurement apparatus or the like, the relative value is obtained by a standard sample. Details of the measurement method are given in Examples.

In one embodiment of the present invention, a volume-based mean particle diameter ($D_{50}$) measured by laser-diffraction particle size-distribution measurements is preferably 0.1 μm or more and 10 μm or less. $D_{50}$ is more preferably 0.2 μm or more and 8 μm or less, and further preferably 0.3 μm or more and 6 μm or less.

In addition to above Li, P and S, halogen may be comprised as a constituent element in the sulfide solid electrolyte according to one embodiment of the present invention. Examples of halogen include F, Cl, Br and I. In this embodiment, Cl or Br is preferably contained, and Cl and Br are more preferably contained.

It may comprise an element such as Si, Ge, Sn, Pb, B, Al, Ga, As, Sb or Bi. Further, it may comprise a chalcogen element (oxygen (O), selenium (Se), tellurium (Te), or the like).

In the sulfide solid electrolyte according to one embodiment of the present invention, it is preferable that the molar ratio of the lithium to the phosphorus, a (Li/P), the molar ratio of the sulfur to the phosphorus, b (S/P), and the molar ratio of the halogen to the phosphorus, c (X/P), satisfy the following formulas (A) to (C).

$$5.0 \leq a \leq 7.5 \quad (A)$$

$$6.5 \leq a+c \leq 7.5 \quad (B)$$

$$0.5 \leq a-b \leq 1.5 \quad (C)$$

(In the formulas, b>0 and c>0 are satisfied.)

When the sulfide solid electrolyte comprises one or more elements M selected from the group consisting of Si, Ge, Sn, Pb, B, Al, Ga, As, Sb and Bi, the molar ratio of each element in the above (A) to (C) is a molar ratio to the total of the element M and phosphorus. For example, the molar ratio a (Li/P) of lithium to phosphorus is Li/(P+M).

The sulfide solid electrolyte according to one embodiment of the present invention preferably has, for example, a composition represented by the following formula (1).

$$Li_a(P_{1-\alpha}M_\alpha)S_bX_c \quad (1)$$

(In the formula, M is one or more elements selected from the group consisting of Si, Ge, Sn, Pb, B, Al, Ga, As, Sb and Bi, and X is one or more elements selected from the group consisting of F, Cl, Br and I; a to c satisfy the following formulas (A) to (C); and α is 0≤α≤0.3.)

$$5.0 \leq a \leq 7.5 \quad (A)$$

$$6.5 \leq a+c \leq 7.5 \quad (B)$$

$$0.5 \leq a-b \leq 1.5 \quad (C)$$

(In the formulas, b>0 and c>0 are satisfied.)

X in the formula (1) represents one or more elements ($x_1$, . . . , $x_n$; n is an integer of 1 or more and 4 or less) selected from the group consisting of F, Cl, Br and I. X preferably consists of one ($x_1$) or two ($x_1$, $x_2$) elements, and more preferably consists of two elements. The molar ratio of each element is not particularly limited.

α is preferably 0.

The above-mentioned molar ratio and composition of each element are not in the molar ratio and composition of the input raw material used for manufacturing, but in the sulfide solid electrolyte which is a product. The molar ratio of each element can be controlled by, for example, adjusting the content of each element in the raw material.

In the present application, the molar ratios and compositions of the elements in the sulfide solid electrolyte are determined by ICP luminescence analysis, except for special circumstances such as difficulty in analysis. The method for measuring by ICP luminescence analysis is described in the Examples.

The sulfide solid electrolyte of the present embodiment can be produced, for example, by treating a sulfide solid electrolyte having an argyrodite-type crystal structure (hereinafter referred to a sulfide solid electrolyte having an argyrodite-type crystal structure prior to the treatment with a media-less pulverizer as a precursor) with a media-less pulverizer.

The method for producing the precursor is not particularly limited. For example, the above-mentioned Patent Documents 1 to 5 can be referred to. In one embodiment of the present invention, the precursor is preferably produced by heat treatment. By heat treatment, precursors containing highly crystalline argyrodite-type crystal structure are obtained. Once the argyrodite-type crystal structure has been produced, the proportion of $PS_4^{3-}$ glass can be very high by treatment with a media-less pulverizer to vitrify a portion thereof.

Hereinafter, one embodiment of the producing method of the present invention will be described.

In the present embodiment, the precursor is obtained by mixing or reacting a raw material containing lithium, phosphorus and sulfur by applying mechanical stress to the raw material to form an intermediate which is a raw material mixture and/or glassy, and then heat-treating the intermediate.

As a raw material to be used, two or more kinds of compounds or simple substances containing elements which the sulfide solid electrolyte to be produced contains as essential, i.e., lithium, phosphorus and sulfur as a whole, are used in combination.

As the material containing lithium, for example, a lithium compound such as lithium sulfide ($Li_2S$), lithium oxide ($Li_2O$) or lithium carbonate ($Li_2CO_3$), and a simple substance of lithium metals, or the like can be given. Among these, lithium sulfide is preferable.

The lithium sulfide can be used without any particular limitation, but a lithium sulfide having a high purity is preferable. Lithium sulfide can be produced, for example, by the method described in JP H07-330312 A, JP H09-283156 A, JP 2010-163356 A and JP 2011-84438 A.

Specifically, lithium hydroxide and hydrogen sulfide are reacted in a hydrocarbon-based organic solvent at 70° C. to 300° C. to form lithium hydrosulfide, and subsequently, hydrogen sulfide is removed from this reaction solution, thereby to produce lithium sulfide (JP 2010-163356 A).

Further, by reacting lithium hydroxide and hydrogen sulfide in an aqueous solvent at 10° C. to 100° C. to form lithium hydrosulfide, and subsequently, hydrogen sulfide is removed from this reaction solution, thereby to produce lithium sulfide (JP 2011-84438 A).

Examples of the raw material containing phosphorus include phosphorus sulfide such as diphosphorus trisulfide ($P_2S_3$) and diphosphorus pentasulfide ($P_2S_5$) and, phosphorus compounds such as sodium phosphate ($Na_3PO_4$) and, and phosphorus simple substance. Among these, phosphorus sulfide is preferable, and diphosphorus pentasulfide is more preferable. A phosphorus compound such as diphosphorus pentasulfide and a phosphorus simple substance can be used without particular limitation as long as they are manufactured and sold industrially.

When the sulfide solid electrolyte contains halogen, the raw material preferably contains a halogen compound represented by the following formula (2), for example.

$$M_l\text{-}X_m \qquad (2)$$

In the formula (2), M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or a compound in which an oxygen element or a sulfur element is bonded to these element, and Li or P is preferable, and Li is more preferable.

X is a halogen selected from the group consisting of F, Cl, Br and I.

In addition, I is an integer of 1 or 2, and m is an integer of 1 to 10. When m is an integer of 2 to 10, that is, when a plurality of Xs are present, Xs may be the same or different. For example, in the case of $SiBrCl_3$ mentioned later, m is 4, and Xs are different elements, i.e. Br and Cl.

Examples of the halogen compound represented by the formula (2) include sodium halide such as NaI, NaF, NaCl and NaBr; lithium halide such as LiF, LiCl, LiBr, and LiI; boron halide such as $BCl_3$, $BBr_3$ and $BI_3$; aluminum halide such as $AlF_3$, $AlBr_3$, $AlI_3$ and $AlCl_3$; silicon halide such as $SiF_4$, $SiCl_4$, $SiCl_3$, $Si_2Cl_6$, $SiBr_4$, $SiBrCl_3$, $SiBr_2Cl_2$ and $SiIo$; phosphorus halide such as $PF_3$, $PF_5$, $PCl_3$, $PCl_5$, $POCl_3$, $PSCl_3$, $PBr_3$, $PSBr_3$, $PBr_5$, $POBr_3$, $PI_3$, $PSI_5$, $P_2Cl_4$ and $P_2I_4$; sulfur halide such as $SF_2$, $SF_4$, $SF_6$, $S_2F_{10}$, $SCl_2$, $S_2Cl_2$ and $S_2Br_2$; germanium halide such as $GeF_4$, $GeCl_4$, $GeBr_4$, $GeI_4$, $GeF_2$, $GeCl_2$, $GeBr_2$ and $GeI_2$; arsenic halide such as $AsF_3$, $AsCl_3$, $AsBr_3$, $AsI_3$ and $AsF_5$; selenium halide such as $SeF_4$, $SeF_6$, $SeCl_2$, $SeCl_4$, $Se_2Br_2$ and $SeBr_4$; tin halide such as $SnF_4$, $SnCl_4$, $SnBr_4$, $SnI_4$, $SnF_2$, $SnCl_2$, $SnBr_2$ and $SnI_2$; antimony halide such as $SbF_3$, $SbCl_3$, $SbBr_3$, $SbI_3$, $SbF_5$ and $SbCl_5$; tellurium halide such as $TeF_4$, $Te_2F_{10}$, $TeF_6$, $TeCl_2$, $TeCl_4$, $TeBr_2$, $TeBr_4$ and $TeI_4$; lead halide such as $PbF_4$, $PbCl_4$, $PbF_2$, $PbCl_2$, $PbBr_2$ and $PbI_2$; bismuth halide such as $BiF_3$, $BiCl_3$, $BiBr_3$ and $BiI_3$, and the like.

Among these, lithium halides such as lithium chloride (LiCl), lithium bromide (LiBr), and lithium iodide (LiI); and phosphorus halides such as phosphorus pentachloride ($PCl_5$), phosphorus trichloride ($PCl_3$), phosphorus pentabromide ($PBr_5$) and phosphorus tribromide ($PBr_3$) are preferable. Among these, lithium halide such as LiCl, LiBr and LiI; and $PBr_3$ are preferable; and lithium halide such as LiCl, LiBr and LiI are more preferable; and LiCl and LiBr are still more preferable.

Halogen compounds described above may be used alone or in a combination of two or more.

In the present embodiment, it is preferable that the sulfide solid electrolyte contains the lithium compound, the phosphorus compound and the halogen compound, wherein at least one of the lithium compound and the phosphorus compound includes sulfur. The combination of lithium sulfide, phosphorus sulfide and lithium halide is more preferable, and the combination of lithium sulfide, diphosphorus pentasulfide and lithium halide is still more preferable.

For example, when lithium sulfide, diphosphorus pentasulfide and lithium halide are used as the raw material of precursors, the molar ratio of the input material may be lithium sulfide:diphosphorus pentasulfide:lithium halide=37 to 88:8 to 25:0.1 to 50.

In the present embodiment, mechanical stress is applied to the above-mentioned raw material to react to form an intermediate. Herein, "applying mechanical stress" is to mechanically apply shear stress, impact force, or the like. Examples of a means for applying mechanical stress include a pulverizer such as a planetary ball mill, a vibration mill and a rolling mill, and a kneader, or the like.

In the present embodiment, it is preferable that the raw material is reacted by applying mechanical stress to vitrify. That is, the raw material powder is pulverized and mixed to a state in which crystallinity cannot be maintained by a mechanical stress that is stronger than that of the prior art. Thus, it is estimated that the sulfide solid electrolyte of the present embodiment exhibits higher ionic conductivity.

For example, when a planetary ball mill is used as a pulverizer, the conditions of pulverization and mixing may be such that the rotational speed is set to several tens to several hundreds of revolutions per minute and the treatment is performed for 0.5 to 100 hours. More specifically, in the case of the planetary ball mill (Model No. P-7, manufactured by Fritsch Co.) used in the Examples, the rotational speed of the planetary ball mill is preferably 350 rpm or more and 400 rpm or less, more preferably 360 rpm or more and 380 rpm or less.

For example, when a zirconia ball is used, the diameter of the ball as the pulverizing medium is preferably 0.2 to 20 mm.

The intermediate produced by pulverizing and mixing is subjected to heat treatment to obtain a precursor. The heat treatment temperature is preferably 350 to 480° C., more preferably 360 to 460° C., and still more preferably 380 to 450° C.

Atmosphere of the heat treatment is not particularly limited, but is preferably atmosphere not under hydrogen sulfide airflow but under an inert gas such as nitrogen, argon, or the like.

The sulfide solid electrolyte of the present embodiment can be produced by treating the precursor in a media-less pulverizer. The media-less pulverizer is a pulverizer, a stirrer, or the like that does not use a pulverizing medium (media). The sulfide solid electrolyte of the present embodiment has a large amount of argyrodite-type crystal structure while partially containing glass. In addition, the ratio of $PS_4^{3-}$ glass to the total glass is high. Therefore, the force applied to the precursor during the treatment with the media-less pulverizer needs to be adjusted so that the argyrodite-type crystal structure is not excessively destroyed. When the argyrodite-type crystal structure is broken, it becomes glassy, and the ratio of glass components other than $PS_4^{3-}$ glass, for example, $P_2S_7^{4-}$ glass and $P_2S_6^{4-}$ glass tends to be high.

For example, in a pulverizing method using zirconia balls, depending on the pulverizing condition, the force applied to the precursor is too strong, and the argyrodite-type crystal structure of the precursor tends to be excessively destroyed. When a media-less pulverizer is used, the forces due to collisions between the precursors are mainly used for the treatment, which is weaker than when pulverizing media are used. It is preferable that the treatment of the present embodiment is carried out with the same degree of force as that in the case of using a media-less pulverizer.

As the media-less pulverizer, an apparatus selected from the group consisting of an air flow type pulverizer, a thin film swirl type stirrer, a high-speed rotation type impact type mill and a thermal plasma processing machine is preferable. As the air flow type pulverizer, for example, a jet mill can be used. As the thin film swirl type stirrer, for example, Filmix (registered trademark) can be used. The treatment may be performed by a dry method or a wet method. For example, from the viewpoint of reducing the drying process, the dry method is preferable. The precursor may be pulverized by the treatment.

In one embodiment of the present invention, it is preferable that the sulfide solid electrolyte obtained by the above-mentioned media-less pulverizer is not subjected to heat treatment. This is because the glass obtained by the treatment with the media-less pulverizer may be crystallized again by the heat treatment. Note that the heat treatment after the treatment with the media-less pulverizer means, for example, heat treatment at a temperature of 300° C. or higher. The heat treatment may be performed after treatment with a media-less pulverizer at temperature at which the glass does not crystallize.

The sulfide solid electrolyte of the present invention can be used in a solid electrolyte layer, a positive electrode, a negative electrode, etc. of a lithium ion secondary battery, and the like.

[Electrode Mix]

The electrode mix according to one embodiment of the present invention comprises the above-mentioned sulfide solid electrolyte of the present invention and an active material. Alternatively, the electrode mix is produced by the sulfide solid electrolyte of the present invention. When a negative electrode active material is used as the active material, the electrode mix becomes a negative electrode mix. On the other hand, when a positive electrode active material is used, the electrode mix becomes a positive electrode mix.

Negative Electrode Mix

A negative electrode mix is obtained by incorporating a negative electrode active material to the sulfide solid electrolyte of the present invention.

As the negative electrode active material, for example, a carbon material, a metal material, or the like can be used. A complex composed of two or more of these can also be used. Further, a negative electrode active material to be developed in the future can also be used.

It is preferred that the negative electrode active material has electron conductivity.

Examples of the carbon materials include graphite (e.g., artificial graphite), graphite carbon fiber, resin calcined carbon, pyrolytic vapor-grown carbon, coke, mesocarbon microbeads (MCMB), furfuryl alcohol resin calcined carbon, polyacene, pitch-based carbon fibers, vapor grown carbon fibers, natural graphite, non-graphitizable carbon and the like.

Examples of the metallic material include a simple metal substance, alloys, and metal compounds. Examples of the simple metal substance include metallic silicon, metallic tin, metallic lithium, metallic indium and metallic aluminum. Examples of the alloy include an alloy comprising at least one of silicon, tin, lithium, indium and aluminum. Examples of the metal compound include a metal oxide. The metal oxide is, for example, silicon oxide, tin oxide or aluminum oxide.

The mixing ratio of the negative electrode active material and the solid electrolyte is preferably the negative electrode active material:the solid electrolyte (mass ratio)=95:5 to 5:95, more preferably 90:10 to 10:90, and still more preferably 85:15 to 15:85.

When the content of the negative electrode active material in the negative electrode mix is too small, the electric capacity becomes small. Further, when the negative electrode active material has electron conductivity and does not contain a conductive aid, or contains only a small amount of a conductive aid, it is considered that the electron conductivity (electron conduction path) in the negative electrode may be lowered to decrease the rate characteristic, or the utilization rate of the negative electrode active material may be lowered to decrease the electric capacity. On the other hand, when the content of the negative electrode active material in the negative electrode mix is too large, it is considered that the ionic conductivity (ion conduction path) in the negative electrode may be lowered to decrease the rate characteristics, or the utilization rate of the negative electrode active material may be lowered to decrease the electric capacity.

The negative electrode mix may further contain a conductive aid.

When the electron conductivity of the negative electrode active material is low, it is preferable to add a conductive aid. The conductive aid may have conductivity, and the electronic conductivity thereof is preferably $1 \times 10^3$ S/cm or more, more preferably $1 \times 10^5$ S/cm or more.

Specific examples of the conductive aid include a substance containing at least one element selected from the group consisting of carbon, nickel, copper, aluminum, indium, silver, cobalt, magnesium, lithium, chromium, gold, ruthenium, platinum, beryllium, iridium, molybdenum, niobium, osmium, rhodium, tungsten and zinc, and more preferably, a simple carbon or a carbon material other than simple carbon, and a simple metal substance, metal mixture or metal compound containing nickel, copper, silver, cobalt, magnesium, lithium, ruthenium, gold, platinum, niobium, osmium or rhodium, which have high conductivity.

Specific examples of the carbon material include carbon black such as Ketjenblack, acetylene black, Dencablack, thermal black, channel black, and the like; graphite, carbon fiber, activated carbon, and the like, which can be used alone or in combination with two or more kinds. Among them, acetylene black, Dencablack, and Ketjenblack, which have high electron conductivity, are preferable.

In the case where the negative electrode mix contains the conductive aid, the content of the conductive aid in the negative electrode mix is preferably 1 to 40 mass %, more preferably 2 to 20 mass %. It is considered that when the content of the conductive aid is too small, the electronic conductivity of the negative electrode may be lowered to decrease the rate characteristic, or the utilization rate of the negative electrode active material may be lowered to decrease the electric capacity. On the other hand, when the content of the conductive aid is too large, the amount of the negative electrode active material and/or the amount of the solid electrolyte decreases. It is presumed that when the amount of the negative electrode active material decreases, the electric capacity decreases. In addition, it is considered that when the amount of the solid electrolyte is reduced, the ionic conductivity of the negative electrode may be lowered to decrease the rate characteristics or the utilization rate of the negative electrode mix may be lowered to decrease the electric capacity.

In order to allow the negative electrode active material and the solid electrolyte to be bound tightly to each other, a binder may be further included.

As the binder, fluorine-comprising resins such as polytetrafluoroethylene (PTFE), polyvinylidene fluoride (PVDF) and fluorine rubber; thermoplastic resins such as polypropylene and polyethylene; ethylene-propylene-diene rubber (EPDM), sulfonated EPDM, natural butyl rubber (NBR), and the like can be used alone or as mixtures of two or more kinds. In addition, an aqueous dispersion of cellulose or styrene butadiene rubber (SBR), which is an aqueous binder, can be used.

The negative electrode mix can be produced by mixing a solid electrolyte and a negative electrode active material, and optionally a conductive aid and/or a binder.

Although the mixing method is not particularly limited, for example, a dry mixing using a mortar, a ball mill, a beads mill, a jet mill, a planetary ball mill, a vibrating ball mill, a sand mill or a cutter mill; and a wet mixing in which the raw material is dispersed into an organic solvent and mixed by using a mortar, a ball mill, a beads mill, a planetary ball mill, a vibrating ball mill, a sand mill or Filmix and subsequently the solvent is removed can be applied. Among them, wet mixing is preferable in order not to destroy the negative electrode active material particles.

Positive Electrode Mix

A positive electrode mix is obtained by mixing the positive electrode active material into the solid electrolyte of the present invention.

The positive electrode active material is a material capable of intercalating and desorbing lithium ions, and a material publicly known as a positive electrode active material in the field of batteries can be used. Further, a positive electrode active material to be developed in the future can also be used.

Examples of the positive electrode active material include metal oxides, sulfides, and the like. Examples of sulfides include metal sulfides and non-metal sulfides.

The metal oxide is, for example, a transition metal oxide. Specific examples of the metal oxide include $V_2O_5$, $V_6O_{13}$, $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (0≤Y<1), $Li(Ni_aCo_bMn_c)O_4$ (0<a<2, 0<b<2, 0<c<2, a+b+c=2), $LiMn_{2-Z}Ni_ZO_4$, $LiMn_{2-Z}Co_ZO_4$ (0<Z<2), $LiCoPO_4$, $LiFePO_4$, $CuO$, $Li(Ni_aCo_bAl_c)O_2$ (0<a<1, 0<b<1, 0<c<1, a+b+c=1), and the like.

Examples of the metal sulfide include titanium sulfide ($TiS_2$), molybdenum sulfide ($MoS_2$), iron sulfide (FeS, $FeS_2$), copper sulfide (CuS) and nickel sulfide ($Ni_3S_2$).

In addition, examples of the metallic oxide include bismuth oxide ($Bi_2O_3$) and bismuth lead oxide ($Bi_2Pb_2O_5$) and the like.

Examples of non-metallic sulfides include organic disulfide compounds and carbon sulfide compounds.

In addition to those mentioned above, niobium selenide ($NbSe_3$), metal indium and sulfur can also be used as the positive electrode active material.

The positive electrode mix may further comprise a conductive aid.

The conductive aid is the same as that of the negative electrode mix.

The mixing ratio of the solid electrode and the positive electrode active material of the positive electrode mix, the content of the conductive aid and the method for producing the positive electrode mix are the same as those of the above-mentioned negative electrode mix.

[Lithium Ion Battery]

The lithium ion battery according to one embodiment of the present invention comprises at least one of the sulfide solid electrolyte and the electrode mix of the present invention described above. Alternatively, it is produced by at least one of the sulfide solid electrolyte and the electrode mix of the present invention.

The constituent of the lithium ion battery is not particularly limited, but generally has a structure in which a negative electrode layer, an electrolyte layer and a positive electrode layer are laminated in this order. Hereinafter, each layer of the lithium ion battery will be described.

(1) Negative Electrode Layer

The negative electrode layer is preferably a layer that is produced from the negative electrode mix of the present invention.

Alternatively, the negative electrode layer is a layer that comprises the negative electrode mix of the present invention.

The thickness of the negative electrode layer is preferably 100 nm or more and 5 mm or less, more preferably 1 μm or more and 3 mm or less, and still more preferably 5 μm or more and 1 mm or less.

The negative electrode layer can be produced by a known method, for example, can be produced by a coating method and an electrostatic method (an electrostatic spray method, an electrostatic screen method, etc.).

(2) Electrolyte Layer

The electrolyte layer is a layer containing a solid electrolyte or a layer produced from a solid electrolyte. The solid electrolyte is not particularly limited, but is preferably a sulfide solid electrolyte of the present invention.

The electrolyte layer may consist of a solid electrolyte and may further comprise a binder. As the binder, the same can be used as that for the negative electrode mix of the present invention can be used.

The thickness of the electrolyte layer is preferably 0.001 mm or more and 1 mm or less.

The solid electrolyte of the electrolyte layer may be in fused. Fusion means that a part of the solid electrolyte particles is melted and the melted part integrates with other solid electrolyte particles. Further, the electrolyte layer may be a plate-like body of the solid electrolyte, and as for the plate-like body, there may be cases where part or all of the solid electrolyte particles are melted to form a plate-like body.

The electrolyte layer can be produced by a publicly-known method, for example, a coating method or an electrostatic method (an electrostatic spray method, an electrostatic screen method, etc.).

(3) Positive Electrode Layer

The positive electrode layer is a layer that comprises a positive electrode active material. Preferably, the positive electrode layer is a layer that comprises the positive electrode mix of the present invention or a layer produced from the positive electrode mix of the present invention.

The thickness of the positive electrode layer is preferably 0.01 mm or more and 10 mm or less.

The positive electrode layer can be produced by a publicly-known method, for example, a coating method, an electrostatic method (an electrostatic spray method, an electrostatic screen method, etc.).

(4) Current Collector

The lithium ion battery of one embodiment of the present invention preferably further comprises a current collector. For example, the negative electrode current collector is provided on the side opposite to the electrolyte layer side of the negative electrode layer, and the positive electrode current collector is provided on the side opposite to the electrolyte layer side of the positive electrode layer.

As the current collector, a plate-like body or a foil-like body, and the like formed of copper, magnesium, stainless steel, titanium, iron, cobalt, nickel, zinc, aluminum, germanium, indium, lithium or an alloy thereof, or the like.

The lithium ion battery of one embodiment of the present invention can be produced by attaching and jointing the above-described members. As a method of jointing, a method of laminating each member, pressing and crimping the members, a method of pressing through between two rolls (roll to roll), and the like, can be used.

Jointing may be conducted with an active material having an ionic conductivity or an adhesive material that does not impair ionic conductivity on the jointing surface.

In the jointing, heat fusing may be used within a range that the crystal structure of the solid electrolyte is not changed.

The lithium ion battery of one embodiment of the present invention can also be produced by sequentially forming the above-described members. It can be produced by a publicly-known method, for example, a coating method, an electrostatic method (an electrostatic spray method, an electrostatic screen method, etc.).

EXAMPLES

Hereinafter, the present invention will be described in more detail with reference to Examples.

Evaluation methods are as follows.

(1) Volume-Based Mean Particle Size ($D_{50}$)

A measurement was performed with a laser diffraction/scattering type particle diameter distribution measurement device (manufactured by HORIBA, LA-950V2 model LA-950W2).

A mixture of dehydrated toluene (Wako Pure Chemical Industries, Ltd., Special Grade) and tertiary butyl alcohol (Wako Pure Chemical Industries, Ltd., Special Grade) in a weight ratio of 93.8:6.2 was used as a dispersion medium. 50 mL of the disperse medium was poured into a flow cell of the device, and circulated. Thereafter, a measurement object was added to the dispersion medium, then subjected to ultrasonic treatment, and then particle diameter distribution was measured. The addition amount of the measurement object was adjusted so that the red-light transmittance (R) corresponding to the particle concentration was 80 to 90% and the blue-light transmittance (B) corresponding to the particle concentration was 70 to 90% on the measurement screen defined by the device. The calculation conditions used were 2.16 as the value of the refractive index of the measurement object and 1.49 as the value of the refractive index of the dispersion medium, respectively. In the setting of the distribution form, the particle size calculation was performed by fixing the number of repetitions to 15 times.

(2) Ionic Conductivity Measurement

The sulfide solid electrolyte produced in each Example was filled in a tablet molding machine, and a pressure of 22 MPa was applied to form a molded body. Carbon was placed on both sides of the molded body as an electrode, and pressure was applied again by a tablet molding machine, whereby a molded body for measurement (diameter: about 10 mm, thickness: 0.1 to 0.2 cm) was produced. The ionic conductivity of this molded body was measured by AC impedance measurement. The conductivity values at 25° C. were adopted.

(3) Powder X-Ray Diffraction (XRD) Measurement

A circular pellet having a diameter of 10 mm and a height of 0.1 to 0.3 cm was molded from the sulfide solid electrolyte produced in each Example to obtain a sample. The sample was measured without exposure to air using an XRD airtight holder. The $2\theta$ position of the diffraction peak was determined by the centroid method using an XRD analysis program JADE.

Measurement was conducted under the following conditions by using a powder X-ray diffractometer SmartLab manufactured by Rigaku Corporation.

Tube voltage: 45 kV
Tube current: 200 mA
X-ray wavelength: Cu-Kα ray (1.5418 Å)
Optical system: Parallel beam system
Slit configuration: solar slit 5°, incident slit: 1 mm, light receiving slit: 1 mm
Detector: Scintillation counter
Measurement range: $2\theta$=10 to 60 deg
Step width, scan speed: 0.02 deg, 1 deg/min In the analysis of the peak position for confirming the existence of the crystal structure from the measurement result, the peak position was obtained by drawing the baseline by cubic approximation using the XRD analysis program JADE.

Intensity Ratio (Ib/Ip) Between the Peak Intensity Ip of the Diffraction Peak B and the Diffraction Intensity Ib of the High-Angle-Side Low Part of the Diffraction Peak B The peak-intensity ratios were calculated from the measured results using Excel spreadsheet software. Firstly, the measured results were averaged by a weighted average of 7 points, then averaged again by a weighted average of 7 points using the averaged values, and then averaged again by a weighted average of 7 points using the averaged values, thereby smoothed. Using the smoothed points, a differential curve was generated using the difference between adjacent smoothed points as a differential value.

The maximum value of the measured intensity in the range of $2\theta$=29.7±0.5 deg was defined as the peak intensity Ip of the peak B. The measured intensity of the angle at a point where the value of the differential curve becomes 0 (a point where the value changes from positive (plus) to negative (minus)) in the wide-angle region from the maximum intensity is defined as Ib. The Ib/Ip was calculated from these values.

Si-Relative Half-Value Width

In the XRD pattern, the minimum diffraction intensity in the range of $2\theta$=10 to 60 deg ($I_{back}$) was used as the background. The peak intensity of the diffraction peak B ($I_B$) was calculated by subtracting the diffraction intensity in the background ($I_{back}$) from the measured peak intensity of the diffraction peak B ($I_{BR}$). In the diffracted peak B, 2 angles (d1, d2) at which the peak intensities are half of the $I_B$ were obtained, and the difference between d1 and d2 was defined as the half-value width A (Δd: measured value).

Next, an XRD pattern was measured using Si (manufactured by Rigaku Corporation) as a sample. The half-value width ($\Delta d_{Si}$) and the peak intensity ($I_{Si}$) of the diffraction peak with 2θ=28.6±0.5 deg were determined in the same manner as the half-value width A above. The background was set to a value of the minimum diffraction intensity in the range of 2θ=10 to 60 deg.

From the half-value width A ($\Delta d$) and the half-value width of Si ($\Delta d_{Si}$), the Si-relative half-value width ($\Delta d/\Delta d_{Si}$) was calculated.

When the half-value width of Si ($\Delta d_{Si}$) is 0.3 or more, the measurement is defective. Since it is considered that the device itself or the measuring condition is defective, $\Delta d_{Si}$ is made less than 0.3 by re-measuring under a suitable condition.

(4) ICP Measurement

The sulfide solid electrolyte produced in the Examples was weighed and collected in vials in an argon-atmosphere. A KOH alkaline aqueous solution was placed in a vial, and the sample was dissolved while taking care to the collection of the sulfur content, and the solution was appropriately diluted and used as a measurement solution. This solution was measured with a Paschen Runge type ICP-OES apparatus (SPECTRO ARCOS manufactured by SPECTRO), and the composition was determined.

A calibration solution for Li, P and S was prepared by using a 1000 mg/L standard solution for ICP measurement, and a calibration solution for Cl and Br was prepared by using a 1000 mg/L standard solution for ion chromatography.

Two measurement solutions were prepared for each sample, and five measurements were performed for each measurement solution to calculate an average value. The composition was determined by averaging the measured values of the two measurement solutions.

(5) Solid $^{31}$P-NMR Measurement

Approximately 60 mg of the powder sample was loaded into an NMR-sample tube and a solid $^{31}$P-NMR spectrum was obtained using the device and conditions described below.

Apparatus: ECZ 400 R apparatus (manufactured by JEOL Ltd.)
Observation nucleus: $^{31}$P
Observation frequency: 161.944 MHz
Measurement temperature: Room temperature
Pulse sequence: Single pulse (using 90° pulse)
90° pulse width: 3.8 μm
Waiting time after FID measurement until the next pulse application: 300 s
Rotational speed of magic angle rotation: 12 kHz
Number of integrations: 16 times
Measurement range: 250 ppm to −150 ppm
Chemical shift: obtained by using $(NH_4)_2HPO_4$ (chemical shift 1.33 ppm) as external reference.

The resulting solid $^{31}$P-NMR spectrum were analyzed for peaks ranging from 60 to 120 ppm using the software "FT-NMR" (software contained in the second revised edition of "Data-Processing of FT-NMR by Personal Computer" (Sankyo Publishing)) to determine separated peaks.

The software calculates separated peaks, calculated values of the NMR signal, and a residual sum of squares R2 using a nonlinear least squares method from NMR signals ranging from 60 to 120 ppm in the solid $^{31}$P-NMR spectrum. Peak separation was completed when the residual sum of squares R2 within the analysis range of the experimental value and the calculated value was 0.007 or less and the smallest number of separation peaks was obtained when the maximum peak height was 1. The means and route of the peak fitting are not particularly limited, but the following points should be noted.

The analysis basically starts the fitting assuming that the number of separated peaks is one. However, it is possible to start the analysis assuming that the number of separated peaks is two or more considering the measured peak shapes of the solid $^{31}$P-NMR measurement. For example, when the peak shape of the measured value is asymmetric, or when the measured value has a shoulder part and a low part, R2 does not become 0.007 or less unless the number of separation peaks is set to two or more.

The fitting is started by inputting an initial value which is considered to be appropriate to the various parameters. Parameters include peak position (ppm), peak height and peak half-value width (Hz). The software calculates the separated peak, the calculated value of the NMR signal, and the residual sum of squares R2 by the nonlinear least squares method, starting from the initial value.

For the peak fitting, a Gaussian function or a Pseudo-Voigt function (linear sum of a Gaussian function and a Lorentz function) is used. The function used is based on a Gaussian function, and the Pseudo-Voigt function is preferably selected when the accuracy is poor. At the time of fitting, the ratio between the Gaussian function and the Lorentz function of the Pseudo-Voigt function is fixed during calculation, but the fixed value needs to be obtained as appropriate.

While finely correcting the above parameters, the fitting is repeated until R2 becomes 0.007 or less. If R2 does not become 0.007 or less, the number of peaks is increased and the analysis is performed in the same manner. Finally, when R2 reaches 0.007 or less, the peak separation is completed. Note that although R2 is set to 0.007 or less as a reference, since the value is preferably smaller, the accuracy may be further increased by repeating the fitting.

In each separated peak obtained by the analysis, chemical shifts showing intensities of half of the maximum value exist at each one point ($\sigma_{An}$ and $\sigma_{Bn}$: ppm) on both sides of the peak. The half-value widths Hn (n is an integer of 1 or more) of the respective separated peaks n (n is a peak number and is 1 or more integer) were obtained by the following formula.

$$Hn(Hz)=161.944\times(\sigma_{An}-\sigma_{Bn})$$

Regarding the area ratio $\varphi_{glass}$ of peaks derived from glass, a peak having a half-value width of the separated peak of 1000 Hz or more was defined as a peak derived from glass, and a peak having a half-value width of 450 Hz or less was defined as a peak derived from crystals.

An area ratio $\varphi_n$ (%) of each peak was obtained from an area Sn of a separated peak n and the sum thereof $S_{all}$ ($=S_1=S_2+\ldots+S_m$; m is an integer of 1 or more) by the following equation.

$$\varphi_n=100\times S_n/S_{all}$$

In addition, for example, a very small peak due to the β crystal of $Li_3PS_4$ may be observed at 86 to 87.6 ppm, but in the present application, it is regarded as an impurity and excluded from the calculation of the half-value widths and the area ratios. It can also be distinguished from the XRD pattern that it is impurity.

Regarding the area ratio $\varphi_{glass}$ of peaks derived from glass, a peak having a half-width of the separated peak of 1000 Hz or more was defined as a peak derived from glass, and it was calculated by the following equation, from the total area $S_g$ of peaks derived from glass and the total area $S_{all}$ of all the peaks.

$$\varphi_{glass}=100\times S_g/S_{all}$$

An area ratio of peaks derived from each glass, $S_{glassx}$, was calculated from the total area $S_{gx}$ of peaks derived from each glass and the total area $S_g$ of peaks delived from glass, by using the following formula.

$$\varphi_{glassx}=100=S_{gx}/S_g$$

Table 1 shows an example of a sulfide solid electrolyte containing only chlorine as a halogen and Table 2 shows an example of a sulfide solid electrolyte containing chlorine and bromine as a halogen for the assignment of the peaks after the peak separation.

TABLE 1

| peak position (ppm) | assignment |
| --- | --- |
| 102-108 | glass ($P_2S_6^{4-}$) |
| 91.4 | glass ($P_2S_7^{4-}$) |
| 82.5-84.5 | glass ($PS_4^{3-}$) |
| 84.0-85.6 | argyrodite-type crystal |
| 82.4-83.7 | argyrodite-type crystal |
| 80.3-81.7 | argyrodite-type crystal |
| 88.5-90.5 | $Li_7PS_6$ crystal |
| 86.0-87.6 | $Li_3PS_4$ (β crystal) |

TABLE 2

| peak position (ppm) | assignment |
| --- | --- |
| 102-108 | glass ($P_2S_6^{4-}$) |
| 91.4 | glass ($P_2S_7^{4-}$) |
| 82.5-84.5 | glass ($PS_4^{3-}$) |
| 87.2-89.4 | argyrodite-type crystal |
| 85.2-86.7 | argyrodite-type crystal |
| 83.2-84.7 | argyrodite-type crystal |
| 81.5-82.5 | argyrodite-type crystal |
| 88.5-90.5 | $Li_7PS_6$ crystal |
| 86.0-87.6 | $Li_3PS_4$ (β crystal) |

(6) Compaction Property

Compaction property was evaluated by using a uniaxial compression device.

Figure 1:
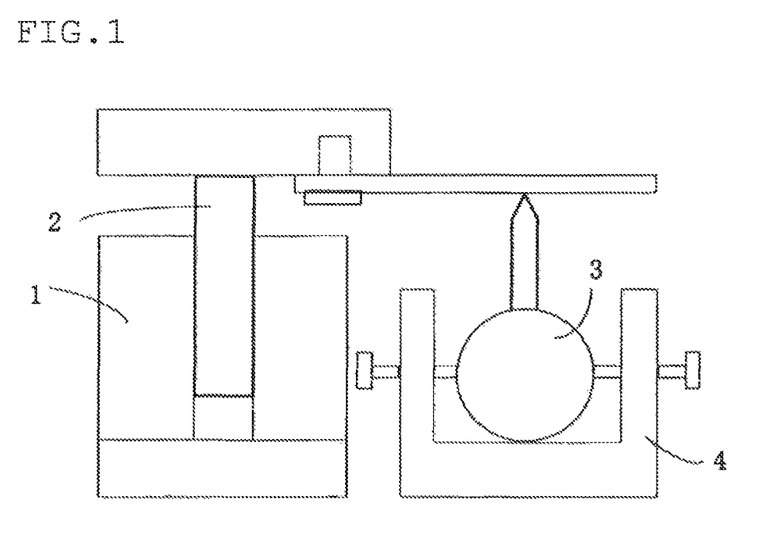
FIG. 1 is a schematic diagram for explaining the evaluation of the compaction property using the uniaxial compression device.
Figure 2:
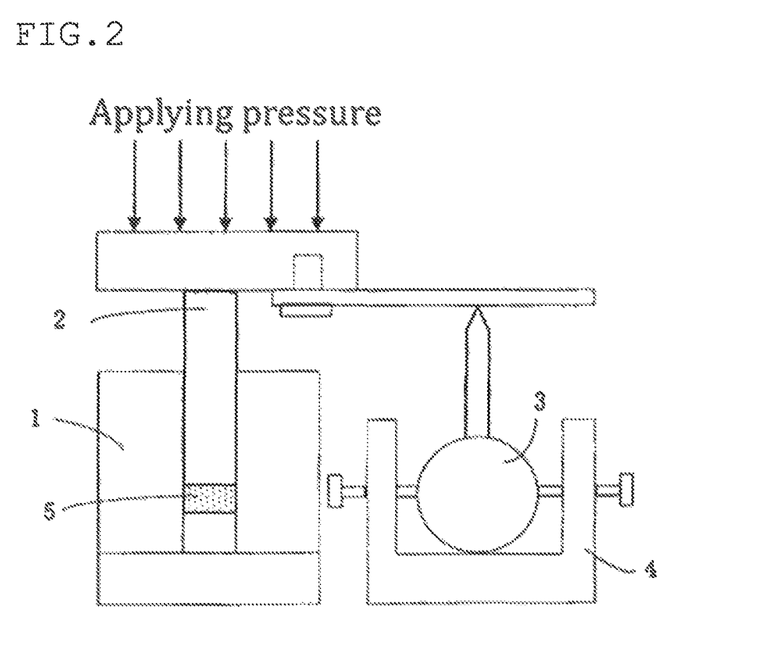
FIG. 2 is a schematic diagram for explaining the evaluation of the compaction property using the uniaxial compression device.

FIGS. 1 and 2 are schematic diagrams for explaining the evaluation of the compaction property using the uniaxial compression apparatus.

The main components of the uniaxial compression apparatus are a pressure-resistant cylindrical container 1, a pressure rod 2 for pressurizing the composite introduced into the internal space of the cylindrical container 1 to increase the density of the composite to a true density, and a measurement means (a micrometer) 3 and a fixing device 4 thereof for measuring the height of the composite 5.

As the cylindrical container 1, a cylindrical container having an outer diameter of 43 mm, an inner diameter of 13 mm, a height of 40 mm, a side thickness of 15 mm, a bottom surface having an outer diameter of 13 mm and a thickness of 10 mm, and made of SKD11 is used. The SKD11 is die steel manufactured by Daido Steel Co., Ltd.

The pressure rod 2 is smoothly inserted into the cylindrical container 1, and has an outer diameter of 13 mm and a length of 50 mm, and is made of SKD11. Above the pressure rod 2, there is a pressing means (not shown in the figure) for pressurizing. In addition, a transmission unit is provided for transmitting the displacement of the pressure rod to the micrometer.

The space ratio (compression space ratio:ε) was measured when the sample was compressed every 108 MPa between 0 and 540 MPa by a uniaxial compression device. Specific examples are as follows.

First, the micrometer value without inserting a sample ($I_0$) was checked (FIG. 1).

Next, 0.3 g of the sample 5, which may be 0.1 g or 0.05 g in the case of a large bulk density, is put into the cylindrical container 1, and the sample is leveled.

The pressure rod 2 is inserted into the container 1, and the value ($I_1$) of the micrometer is checked when the sample 5 is compressed by pressurizing every 108 MPa from 0 to 540 MPa (FIG. 2).

From the height of the sample at the time of compression, the space ratio ε (%) can be calculated using the following formula (A).

$$\varepsilon=[1-\rho_a/\rho_p]\times100=[1-\{m/(\rho_p SL)\}]\times100 \quad (A)$$

(In the formula, $\rho_a$ is the apparent density of the material, $\rho_p$ is the true density of the material, m is the weight of the material to be inserted into the cylindrical container, S is the area of the pressure rods, and L is ($I_0-I_1$).)

The intercept (a) and slope (b) were calculated from the Gurnham equation (log σ=a−bε) for the stress σ-space factor ε. The larger the value of "b", the worse the compaction property. It should be noted that, as "a" increases (when "b" is constant), the log σ-ε line shifts in a direction in which "ε" increases.

Production Example 1

[Production of Lithium Sulfide ($Li_2S$)]

In a 500 mL-separable flask equipped with a stirrer, 200 g of LiOH anhydride (manufactured by Honjo Chemical Corporation) dried under an inert gas was prepared. The temperature was raised under a stream of nitrogen, and the internal temperature was maintained at 200° C. Nitrogen gas was switched to hydrogen sulfide gas (Sumitomo Seika Chemicals Company, Limited) at a flow rate of 500 mL/min, and lithium hydroxide anhydride (LiOH) and hydrogen sulfide were reacted.

Moisture generated by the reaction was condensed by a condenser and recovered. The reaction was carried out for 6 hours at which time 144 mL of water was recovered. The reaction was continued for an additional 3 hours, but no moisture generation was observed.

The product powder was collected and measured for purity and XRD. As a result, the purity was 98.5%, and the peak pattern of $Li_2S$ was confirmed by XRD.

Example 1

(1) Preparation of the Sulfide Solid Electrolyte with an Argyrodite-Type Crystal Structure $Li_2S$ produced in Production Example 1, phosphorus pentasulfide ($P_2S_5$: FS SPEC, manufactured by Thermophores, purity: 99.9% or more) and lithium chloride (LiCl: manufactured by Sigma Aldrich, purity: 99%) were mixed such that the molar ratio ($Li_2S:P_2S_5:LiCl$) was 19:5:16 to obtain a mixture as a starting material (hereinafter, the purity of the starting materials is the same in all examples). 200 g of the mixture and 1780 g of 20 mm-diameter zirconia balls were placed in a container made of SUS (volume 6 L). The container was attached to a vibrating mill (MD-3, manufactured by Chuo Kakohki Co., Ltd.) and mechanical energy was added (mechanical milling treatment) to obtain a glass (intermediate) as a white-yellow powder. The processing conditions of the vibration mill were 1500 revolutions per second and 120 hours at 40° C. under a nitrogen atmosphere having a dew point of −40° C. or less.

Approximately 10 g powder of the above-mentioned intermediate was packed into a Tamman tube (PT2, manufactured by Tokyo Glass Equipment Co., Ltd.) in a glove box in an argon atmosphere, and the opening of the Tamman tube was closed with quartz wool, and sealed with a sealed container made of SUS so that the air could not enter. Three same Tamman tubes were prepared. The sealed container was then placed in an electric furnace (FUW243PA, manufactured by Advantech Toyo Kaisha, Ltd.) and heat treated. Specifically, the temperature was raised from room temperature to 430° C. at 2.5° C./min (raised to 430° C. in 3 hours), and held at 430° C. for 8 hours. Thereafter, the mixture was slowly cooled to obtain about 30 g of a sulfide solid electrolyte (precursor).

(2) Treatment with a Media-Less Pulverizer 30 g of the above precursor was treated by a jet mill (NJ-50, manufactured by Aisin Nanotechnologies, Inc.) in a nitrogen-atmosphere glove box to produce the sulfide solid electrolyte of the present invention. The treatment conditions were as follows: a treatment speed of 180 g/hour (treatment time: 10 minutes); nitrogen as the pulverizing gas; input gas pressure of 2.0 MPa; and pulverizing gas pressure of 2.0 MPa.

The volume-based mean particle diameter ($D_{50}$) of the obtained sulfide solid electrolyte was 3.0 μm. The ionic conductivity (σ) was 3.3 mS/cm.

Figure 3:
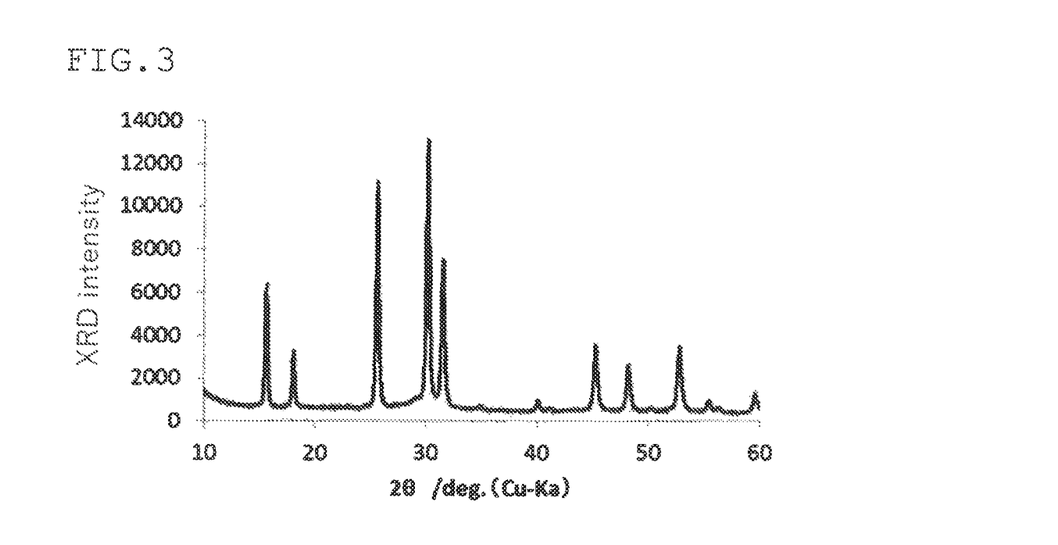
FIG. 3 shows an X-ray diffraction pattern of the sulfide solid electrolyte produced in Example 1.

The XRD pattern of the sulfide solid electrolyte is shown in FIG. 3. Peaks derived from the argyrodite-type crystal structure were observed at 2θ=15.6, 18.1, 25.7, 30.2, 31.6, 45.3, 48.2 and 52.8 deg. From FIG. 3, the peak intensity Ip of the diffraction peak at 2θ=29.7±0.5 deg was 13124.

Figure 4:
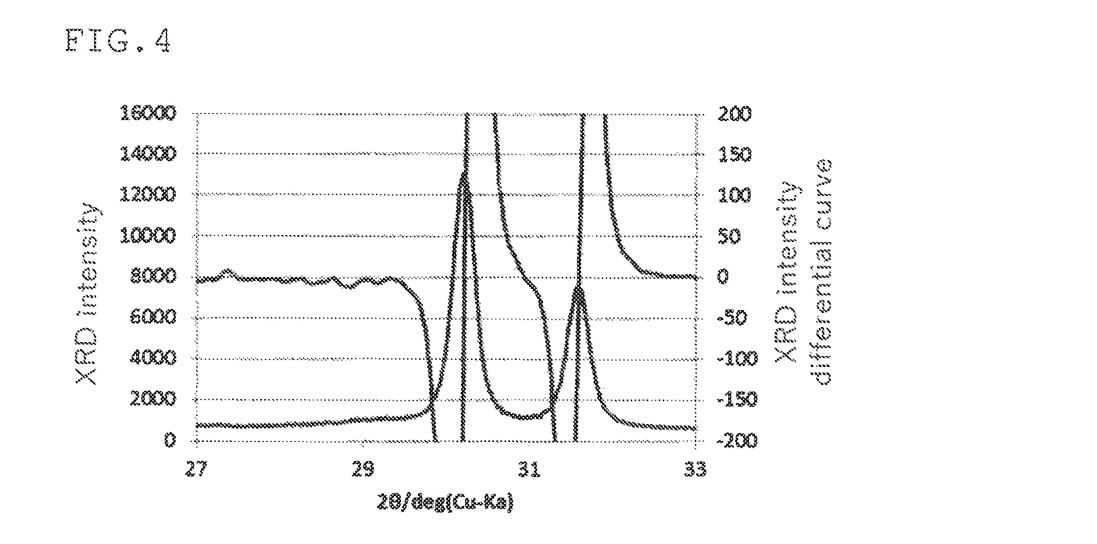
FIG. 4 is an enlarged view of the X-ray diffraction pattern shown in FIG. 3 in the vicinity of $2\theta=27$ to 33 deg, with a differential curve of the X-ray diffraction pattern.

FIG. 4 is an enlarged view of the XRD pattern shown in FIG. 3 in the vicinity of 2θ=27 to 33 deg, with a differential curve of the XRD pattern. From FIG. 4, the diffraction intensity Ib of the low-angle-side low part of the diffraction peak at 2θ=29.7±0.5 deg was 1124 (2θ=30.46 deg).

The sulfide solid electrolyte was analyzed by ICP to determine the molar ratio of each element. As a result, the molar ratio a (Li/P) was 5.4, the molar ratio b (S/P) was 4.4, and the molar ratio c (Cl/P) was 1.6.

Figure 5:
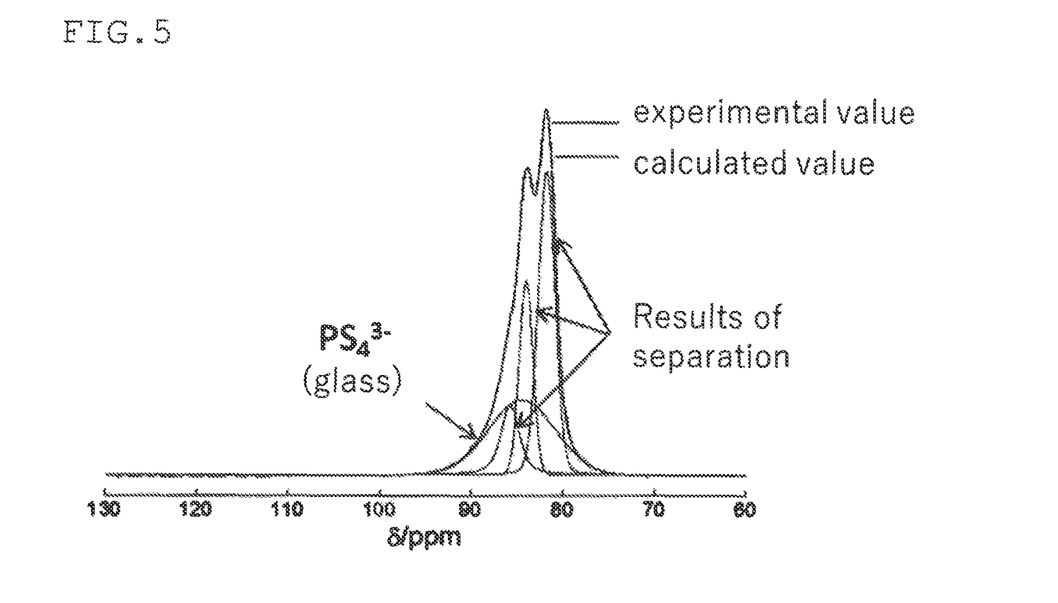
FIG. 5 is a solid $^{31}$P-NMR spectral diagram of the sulfide solid electrolyte produced in Example 1.

FIG. 5 shows the solid $^{31}$P-NMR spectrum of sulfide solid electrolyte.

For Example 1 and after-mentioned Examples and Comparative Examples, The molar ratio of each element in the raw material and the contents of the treatment by the pulverizer are shown in Table 3. The area ratio of the peaks calculated from solid $^{31}$P-NMR measurements of the sulfide solid electrolyte produced in Examples and Comparative Examples are shown in Table 4. The peak intensity Ip of the diffraction peak B of the sulfide solid electrolyte, the diffraction intensity Ib of the high-angle-side low part of the diffraction peak, the intensity ratio, the Si-relative half-value width and the volume-based mean particle diameter ($D_{50}$) are shown in Table 5. The results of evaluating the ionic conductivity a and the compaction property of the sulfide solid electrolyte are shown in Table 6.

TABLE 3

| | Element ratio of raw materials | | | | | |
| --- | --- | --- | --- | --- | --- | --- |
| | Li/P | S/P | X*/P | Cl/P | Br/P | Treatment |
| Example 1 | 5.4 | 4.4 | 1.6 | 1.6 | — | jet mill |
| Example 2 | 5.4 | 4.4 | 1.6 | 1.0 | 0.6 | jet mill |
| Example 3 | 5.4 | 4.4 | 1.6 | 1.0 | 0.6 | jet mill |
| Example 4 | 5.4 | 4.4 | 1.6 | 1.0 | 0.6 | Filmix |
| Comp. Ex. 1 | 5.4 | 4.4 | 1.6 | 1.6 | — | beads mill |
| Comp. Ex. 2 | 6.0 | 5.0 | 1.0 | 1.0 | — | none |
| Comp. Ex. 3 | 5.4 | 4.4 | 1.6 | 1.6 | — | planetary ball mill |

*X is the sum of Cl and Br.

TABLE 4

| | Example 1 | Example 2 | Example 3 | Example 4 | Comp. Ex. 1 | Comp. Ex. 2 | Comp. Ex. 3 |
| --- | --- | --- | --- | --- | --- | --- | --- |
| area ratio of the peak derived from $P_2S_7^{4-}$ glass (%) | 0.0 | 0.0 | 0.0 | 0.0 | 3.4 | 0.0 | 1.3 |
| area ratio of the peak derived from $PS_4^{3-}$ glass (%) | 34.0 | 14.8 | 9.7 | 2.5 | 50.1 | 0.0 | 37.3 |
| area ratio of the peak derived from $P_2S_6^{4-}$ glass (%) | 0.0 | 0.0 | 0.0 | 0.0 | 4.5 | 0.0 | 1.9 |
| total area ratio of the peak derived from crystal | 66.0 | 85.2 | 91.3 | 97.5 | 42.0 | 100.0 | 59.5 |
| total area ratio of the peak derived from glass ($\varphi_{glass}$) | 34.0 | 14.8 | 9.7 | 25 | 58.0 | 0.0 | 40.5 |
| area ratio of the peak derived from $PS_4^{3-}$, glass to $\varphi_{glass}$ (%) | 100 | 100 | 100 | 100 | 86.4 | — | 92.1 |

TABLE 5

| | XRD Intensity | | | | |
| --- | --- | --- | --- | --- | --- |
| | Ip (2θ:deg) | Ib (2θ:deg) | intensity ratio Ib/Ip | Si-relative half-value width | $D_{50}$ (μm) |
| Example 1 | 13124 (30.22) | 1124 (30.46) | 0.085 | 1.32 | 3.0 |
| Example 2 | 13579 (29.90) | 957 (30.68) | 0.070 | 1.34 | 2.8 |
| Example 3 | 13391 (29.92) | 888 (30.68) | 0.066 | 1.27 | 3.7 |
| Example 4 | 11119 (29.92) | 723 (30.68) | 0.065 | 1.25 | 3.8 |
| Comp. Ex. 1 | 7272 (30.04) | 1738 (30.80) | 0.235 | 2.65 | 1.8 |
| Comp. Ex. 2 | 20896 (29.96) | 1004 (30.72) | 0.048 | 1.22 | 8.9 |
| Comp. Ex. 3 | 14341 (30.12) | 1124 (30.86) | 0.078 | 1.20 | 9.8 |

TABLE 6

| | ionic conductivity (mS/m) | Gurnham intercept (a) | Gurnham slope (b) |
|---|---|---|---|
| Example 1 | 3.3 | 608 | 5.1 |
| Example 2 | 5.6 | 1052 | 6.5 |
| Example 3 | 5.6 | 1029 | 6.4 |
| Example 4 | 6.1 | 1101 | 6.5 |
| Comp. Ex. 1 | 2.2 | 900 | 6.9 |
| Comp. Ex. 2 | 3.2 | 1269 | 13.7 |
| Comp. Ex. 3 | 2.1 | — | — |

Example 2

(1) Preparation of the Sulfide Solid Electrolyte with an Argyrodite-Type Crystal Structure (Precursor)

$Li_2S$ produced in Example 1, $P_2S_5$, LiCl and lithium bromide (LiBr, manufactured by sigma-aldrich) were mixed so that the molar ratio ($Li_2S:P_2S_5:LiCl:LiBr$) is 1.9:0.5:1.0:0.6 to obtain 30 g of mixture as the starting material. A sulfide solid electrolyte was obtained in the same manner as in Example 1 except that the mixture was changed.

(2) Treatment with a Media-Less Pulverizer

A sulfide solid electrolyte was produced and evaluated in the same manner as in Example 1 except that the input gas pressure was 0.8 MPa and the pulverizing gas pressure was 0.8 MPa. Results are shown in Table 3 to 6.

From the XRD pattern of the sulfide solid electrolyte, peaks derived from argyrodite-type crystal structure were observed at 2θ=25.2±0.5 deg and 29.7±0.5 deg. The same peaks were observed for the Examples and Comparative Examples described later.

Example 3

A sulfide solid electrolyte was produced and evaluated in the same manner as in Example 2 except that the input gas pressure was 0.4 MPa and the pulverizing gas pressure was 0.4 MPa in the treatment by the media-less pulverizer. Results are shown in Table 3 to 6.

Example 4

A sulfide solid electrolyte was produced and evaluated in the same manner as in Example 2 except that a thin film swirling stirrer was used for treating instead of the jet mill as the medium-less pulverizer.

A thin film swirl stirrer (trade name "T.K. Filmix", manufactured by Primix Corporation) was used. 30 g of sulfide solid electrolyte (precursor) was dispersed in 311 mL of toluene, which was a dispersing medium, and was charged into a stirring tank of the apparatus. The rotating blades were attached to the rotating shaft so that the distance between the stirring tank and the rotating blades was 2 mm. The peripheral speed of the rotating blade was set to 30 m/sec, and the treatment was performed for 180 seconds. The resulting slurries were dried to obtain a sulfide solid electrolyte.

Evaluation results are shown in Table 3 to 6.

Comparative Example 1

$Li_2S$ produced in Example 1, $P_2S_5$, and LiCl were mixed so that the molar ratio ($Li_2S:P_2S_5:LiCl$) is 1.9:0.5:1.6 to obtain 30 g of mixture as a starting material.

The mixture and 30 g of zirconia balls having a diameter of 10 mm were placed in a zirconia pot (45 mL) of a planetary ball mill (manufactured by Fritsch Co., Ltd., model No. P-7) and completely sealed. The inside of the pot was an argon atmosphere. The mixture was treated (mechanical milling) for 15 hours at a rotational speed of 370 rpm in the planetary ball mill to obtain a glassy powder (intermediate). The intermediate was heat treated in the same manner as in Example 1 to prepare a precursor.

The resulting precursor was dispersed in 750 mL of solvent (dehydrated toluene, Wako pure chemical) in a glove box under a nitrogen atmosphere to obtain about 5.8% by weight of the slurry. The slurry was pulverized using a bead mill (LMZ015, manufactured by Ashizawa Finetech, Inc.) while maintaining a nitrogen-atmosphere. Specifically, 456 g of zirconia beads having a diameter of 0.5 mm were used as the pulverizing medium, and the bead mill apparatus was operated at a peripheral speed of 12 m/sec and a flow rate of 500 mL/min, and the slurry was introduced into the apparatus and passed once. The treated slurry was placed in a nitrogen-substituted Schlenk bottle and dried under reduced pressure to obtain a sulfide solid electrolyte.

Evaluation results of the sulfide solid electrolyte are shown in Table 3 to 6.

Figure 6:
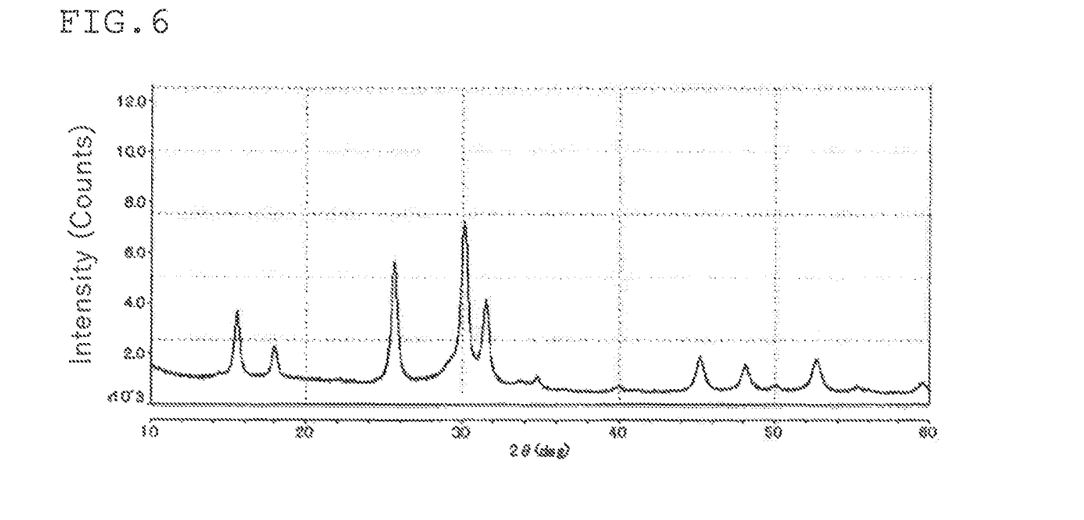
FIG. 6 is an X-ray diffractive pattern of the sulfide solid electrolyte produced in Comparative Example 1.

The XRD pattern of the sulfide solid electrolyte is shown in FIG. 6.

Comparative Example 2

The raw material was mixed so that the molar ratio of $Li_2S$, $P_2S_5$ and LiCl ($Li_2S:P_2S_5:LiCl$) is 2.5:0.5:1.0. Specifically, 0.642 g of $Li_2S$, 0.621 g of $P_2S_5$ and 0.237 g of LiCl were mixed to obtain a raw material mixture.

The raw material mixture and 30 g of zirconia balls having a diameter of 10 mm were placed in a zirconia pot (45 mL) of a planetary ball mill (manufactured by Fritsch Co. Ltd., model No. P-7) and completely sealed. The inside of the pot was an argon atmosphere. The raw material was treated (mechanical milling) for 15 hours at a rotational speed of 370 rpm in the planetary ball mill to obtain a glassy powder (intermediate).

Approximately 1 g powder of the above-mentioned intermediate was packed into a Tamman tube (PT2, manufactured by Tokyo Glass Equipment Co., Ltd.) in a glove box in an argon atmosphere, and the opening of the Tamman tube was closed with quartz wool, and sealed with a sealed container made of SUS so that the air could not enter. The sealed container was then placed in an electric furnace (FUW243PA, manufactured by Advantech Toyo Kaisha, Ltd.) and heat treated. Specifically, the temperature was raised from room temperature to 430° C. at 2.5° C./minute (raised to 430° C. in about 3 hours) and held at 430° C. for 8 hours. Thereafter, it was slowly cooled to obtain a sulfide solid electrolyte.

The resulting sulfide solid electrolyte was evaluated. Evaluation results are shown in Table 3 to 6.

Comparative Example 3

0.5 g of the glass (intermediate) obtained in the same manner as in Example 1 (1), 1.5 g of sulfide solid electrolyte (precursor) obtained in the same manner as in Example 1 (1), and 30 g of zirconia balls having diameters of 2 mm were placed in zirconia pots (45 mL) of a planetary ball mill (manufactured by Fritsch Co., Ltd.: Model No. P-7) and completely sealed. The inside of the pot was an argon atmosphere. A planetary ball mill was operated at 100 rpm for 0.5 hour to obtain a sulfide solid electrolyte.

Evaluation results are shown in Table 3 to 6.

[Lithium Ion Battery]

The sulfide solid electrolyte obtained in the Examples was used to produce a lithium ion battery and the capacity retention rate was evaluated.

(A) Production of Lithium Ion Battery 50 mg of the sulfide solid electrolyte obtained by each example was put into a stainless-steel mold having a diameter of 10 mm, flattened, and the layer thickness of the electrolyte layer was made uniform, and then pressure molding was performed by applying a pressure of 185 MPa from the top surface of the electrolyte layer with a hydraulic press (P-6, manufactured by Riken Kiki Co., Ltd.).

$Li_4Ti_5O_{12}$ coated $LiNi_{0.8}Co_{0.15}Al_{0.05}O_2$ as the positive electrode active material and the sulfide solid electrolyte obtained by each example as the solid electrolyte were mixed at a ratio of 70:30 by weight to form a positive electrode material, 15 mg of the positive electrode material was put on the upper surface of the electrolyte layer and flattened, so that the layer thickness of the positive electrode layer became uniform, and then pressure molding was performed by applying a pressure of 407 MPa from the top surface of the positive electrode layer with a hydraulic press (P-6, manufactured by Riken Kiki Co., Ltd.).

The graphite powder as the negative electrode active material and the sulfide solid electrolyte obtained by each example were mixed at a ratio of 60:40 by weight to form a negative electrode material. 12 mg of the negative electrode material was put into the surface of the electrolyte layer facing away from the positive electrode layer to make the thickness of the negative electrode material uniform, and a pressure of 555 MPa was applied from the upper surface of the negative electrode layer by a hydraulic press (P-6, manufactured by Riken Kiki Co., Ltd.) to perform pressure molding, thereby producing a lithium ion battery having a three-layered structure of a positive electrode, a solid electrolyte layer, and a negative electrode.

(B) Cycle Characteristic Test

The lithium ion battery produced in above (A) was left to stand in a thermostat set at 25° C. for 12 hours and then evaluated.

At 1st cycle, charging was conducted to 4.2 V at 0.1 C (0.189 mA) and discharging was conducted to 3.1 V at 0.1 C (0.189 mA); at 2nd to 10th cycle, charging was conducted to 4.2 V at 0.5 C (0.945 mA) and discharging was conducted to 3.1 V at 0.5 C (0.945 mA); at 11th cycle, charging was conducted to 4.2 V at 0.1 C (0.189 mA) and discharging was conducted to 3.1 V at 0.1 C (0.189 mA); at 12th to 16th cycle, charging was conducted to 4.2 V at 0.2 C (0.378 mA) and discharging was conducted to 3.1 V at 0.2 C (0.378 mA), 0.5 C (0.945 mA), 1 C (1.89 mA), 2 C (3.78 mA), 5 C (9.45 mA) for respective cycles; at 17th to 19th cycle, charging was conducted to 4.2 V at 0.5 C (0.945 mA) and discharging was conducted to 3.1 V at 0.5 C (0.945 mA); and at 20th cycle, charging was conducted to 4.2 V at 0.1 C (0.189 mA) and discharging was conducted to 3.1 V at 0.1 C (0.189 mA).

At the following 19 cycles (21st to 39th cycle), charging was conducted to 4.2 V at 0.5 C (0.945 mA) and discharging was conducted to 3.1 V at 0.5 C (0.945 mA), and at subsequent 1 cycle (40th cycle), charging was conducted to 4.2 V at 0.1 C (0.189 mA) and discharging was conducted to 3.1 V at 0.1 C (0.189 mA); which is a set of 20 cycles. The set was repeated four times for a total of 100 cycles. The capacity retention rate was the ratio of the discharge capacity at the 100th cycle to the maximum discharge capacity during the cycle.

The capacity retention rate is shown in Table 7.

TABLE 7

|  | capacity retention rate (%) |
|---|---|
| Example 1 | 97.5 |
| Example 2 | 95.0 |
| Example 3 | 97.0 |
| Example 4 | 95.8 |
| Comp. Ex. 1 | 85.4 |
| Comp. Ex. 2 | 88.9 |
| Comp. Ex. 3 | 85.1 |

While embodiments and/or examples of the invention have been described in some detail above, those skilled in the art will readily make many changes to these illustrative embodiments and/or examples without materially departing from the novel teachings and advantages of the invention. Accordingly, many of these modifications are within the scope of the present invention.

The documents described in the specification and the specification of Japanese application(s) on the basis of which the present application claims Paris convention priority are incorporated herein by reference in its entirety.

The invention claimed is:

1. A sulfide solid electrolyte comprising lithium, phosphorus and sulfur,
wherein the sulfide solid electrolyte has a diffraction peak A at 2θ=25.2±0.5 deg and a diffraction peak B at 29.7±0.5 deg in powder X-ray diffraction using CuKα rays,
an area ratio of a peak derived from $PS_4^{3-}$ glass to the total area of peaks derived from glass observed in solid $^{31}$P-NMR measurement is 90% or more and 100% or less, and
an area ratio of peaks derived from glass to the total area of all peaks at 60 to 120 ppm observed in solid $^{31}$P-NMR measurement is 1% or more and 40% or less.

2. The sulfide solid electrolyte according to claim 1, wherein an intensity ratio (Ib/Ip) between a peak intensity Ip of the diffraction peak B and a diffraction intensity Ib of a high-angle-side low part of the diffraction peak B is 0.050 or more and 0.200 or less.

3. The sulfide solid electrolyte according to claim 1, wherein a Si-relative half-value width of the diffractive peak B is 1.25 or more and 2.50 or less.

4. The sulfide solid electrolyte according to claim 1, wherein a volume-based mean particle diameter measured by laser-diffraction particle size-distribution measurements is 0.1 μm or more and 10 μm or less.

5. The sulfide solid electrolyte according to claim 1, further comprising halogen.

6. The sulfide solid electrolyte according to claim 5, wherein a molar ratio of the lithium to the phosphorus, a (Li/P), a molar ratio of the sulfur to the phosphorus, b (S/P), and a molar ratio of the halogen to the phosphorus, c (X/P), satisfy the following formulas (A) to (C):

$$5.0 \leq a \leq 7.5 \quad (A)$$

$$6.5 \leq a+c \leq 7.5 \quad (B)$$

$$0.5 \leq a-b \leq 1.5 \quad (C)$$

wherein in the formulas, b>0 and c>0 are satisfied.

7. The sulfide solid electrolyte according to claim 5, having a composition represented by the following formula (1):

$$Li_a(P_{1-\alpha}M_\alpha)S_bX_c \quad (1)$$

wherein in the formula, M is one or more elements selected from the group consisting of Si, Ge, Sn, Pb, B, Al, Ga, As, Sb and Bi, and X is one or more elements selected from the group consisting of F, Cl, Br and I; a to c satisfy the following formulas (A) to (C); and α satisfies $0 \leq \alpha \leq 0.3$:

$$5.0 \leq a \leq 7.5 \quad \text{(A)}$$

$$6.5 \leq a+c \leq 7.5 \quad \text{(B)}$$

$$0.5 \leq a-b \leq 1.5 \quad \text{(C)}$$

wherein in the formulas, b>0 and c>0 are satisfied.

8. The sulfide solid electrolyte according to claim 5, comprising chlorine (Cl).

9. The sulfide solid electrolyte according to claim 5, comprising chlorine (Cl) and bromine (Br).

10. A method for producing a sulfide solid electrolyte, wherein the solid sulfide electrolyte (precursor) having an argyrodite-type crystal structure is treated by a media-less pulverizer.

11. The process for producing a sulfide solid electrolyte according to claim 10, wherein the media-less pulverizer is an air flow type pulverizer or a thin film swirl type stirrer.

12. The process for producing a sulfide solid electrolyte according to claim 10, wherein the media-less pulverizer is a jet mill.

13. The process for producing a sulfide solid electrolyte according to claim 10, wherein the sulfide solid electrolyte having the argyrodite-type crystal structure is produced by heat treatment.

14. The process for producing a sulfide solid electrolyte according to claim 13, wherein the heat treatment temperature is 350 to 480° C.

15. The process for producing a sulfide solid electrolyte according to claim 10, wherein the heat treatment is not performed after the treatment by the media-less pulverizer.

16. An electrode mix comprising the sulfide solid electrolyte according to claim 1 and an active material.

17. A lithium ion battery comprising the sulfide solid electrolyte according to claim 1.

18. A lithium ion battery comprising the electrode mix according to claim 16.

19. The sulfide solid electrolyte according to claim 1, wherein an intensity ratio (Ib/Ip) between a peak intensity Ip of the diffraction peak B and a diffraction intensity Ib of a high-angle-side low part of the diffraction peak B is 0.050 or more and 0.200 or less, and
a Si-relative half-value width of the diffractive peak B is 1.25 or more and 2.50 or less.

20. The sulfide solid electrolyte according to claim 1, wherein an intensity ratio (Ib/Ip) between a peak intensity Ip of the diffraction peak B and a diffraction intensity Ib of a high-angle-side low part of the diffraction peak B is 0.050 or more and 0.200 or less, and
a volume-based mean particle diameter measured by laser-diffraction particle size-distribution measurements is 0.1 μm or more and 10 μm or less.

21. The sulfide solid electrolyte according to claim 1, wherein the peak area ratio derived from $PS_4^{3-}$ glass is 100%.

* * * * *